(12) United States Patent
Mocanu et al.

(10) Patent No.: US 11,555,469 B2
(45) Date of Patent: Jan. 17, 2023

(54) PISTON BOWLS

(71) Applicant: Cummins Inc., Columbus, IN (US)

(72) Inventors: Florin Mocanu, Columbus, IN (US);
Eric M. Osecky, Indianapolis, IN (US);
Robert G. Sperry, Columbus, IN (US);
John M. Deur, Columbus, IN (US)

(73) Assignees: CUMMINS INC., Columbus, IN (US);
ACHATES POWER, INC., San Diego, CA (US)

( * ) Notice: Subject to any disclaimer, the term of this patent is extended or adjusted under 35 U.S.C. 154(b) by 0 days.

(21) Appl. No.: 17/313,954

(22) Filed: May 6, 2021

(65) Prior Publication Data

US 2021/0404414 A1    Dec. 30, 2021

Related U.S. Application Data

(60) Provisional application No. 63/045,480, filed on Jun. 29, 2020.

(51) Int. Cl.
*F02F 3/26*    (2006.01)
*F02M 61/18*    (2006.01)
*F02F 3/10*    (2006.01)

(52) U.S. Cl.
CPC .................. *F02F 3/26* (2013.01); *F02F 3/10* (2013.01); *F02M 61/18* (2013.01)

(58) Field of Classification Search
CPC ............... F02F 3/26; F02F 3/10; F02M 61/18

USPC ......................................................... 123/294
See application file for complete search history.

(56) References Cited

U.S. PATENT DOCUMENTS

| | | | |
|---|---|---|---|
| 8,800,528 B2 | 8/2014 | Fuqua | |
| 9,163,505 B2 | 10/2015 | Dion | |
| 9,593,627 B2 | 3/2017 | Fuqua | |
| 9,840,965 B2 | 12/2017 | Venugopal | |
| 9,995,213 B2 | 6/2018 | Abani | |
| 2006/0060673 A1* | 3/2006 | Mack | F02M 63/0064 239/533.2 |
| 2007/0068482 A1* | 3/2007 | Yamashita | F02B 23/105 123/276 |
| 2017/0067391 A1* | 3/2017 | Brandt | F02B 23/0624 |
| 2018/0100466 A1 | 4/2018 | Bowditch | |
| 2020/0116103 A1* | 4/2020 | John | F02F 3/26 |

FOREIGN PATENT DOCUMENTS

WO        2019050804 A1    3/2019

\* cited by examiner

*Primary Examiner* — Yi-Kai Wang
(74) *Attorney, Agent, or Firm* — Faegre Drinker Biddle Reath LLP

(57) ABSTRACT

The present disclosure provides piston, comprising: a skirt having an upper body portion; a crown formed at the upper body portion; and a piston bowl formed at the crown. The piston bowl includes a first combustion surface and a second combustion surface opposite the first combustion surface. Each of the first combustion surface and the second combustion surface are formed and positioned to accommodate inflowing injector spray so as to reduce heat transfer caused by impingements made by the inflowing injector spray.

20 Claims, 6 Drawing Sheets

PISTON BOWLS

CROSS-REFERENCE TO RELATED APPLICATIONS

This application claims the benefit of U.S., Provisional Patent Application No. 63/045,480, filed Jun. 29, 2020, entitled "PISTON BOWLS," which is incorporated herein by reference in its entirety.

GOVERNMENT SUPPORT CLAUSE

This invention was made with government support under Other Transaction Authority (OT) agreement number W56HZV-16-9-0001, awarded by the United States Army. The government has certain rights in the invention.

FIELD OF THE DISCLOSURE

The present disclosure generally relates to internal combustion engine piston design and, more particularly, to designs for piston bowls.

BACKGROUND

Efficiency, durability, and manufacturability of components are each important considerations when designing an internal combustion engine. Certain innate limitations exist in efficiency, durability, and manufacturability of those components, and specifically with regard to pistons. Piston design can be difficult as various components within, as well as separate from, the piston experience repetitive movements, extreme conditions (e.g., high temperatures and pressures, rapid changes in temperature, pressure and direction, hard contact with other components, and so forth). Furthermore, certain designs may present inherent manufacturability difficulties such as precise dimensions in restricted or difficult-to-access spaces.

Heat loss is one of the greatest energy losses in internal combustion engines. A significant portion of fuel energy used in an internal combustion engine is lost as heat transferred from a combustion chamber to its coolant (e.g., oil). Complex processes involving the combustion chamber affect heat loss to the cylinder walls, including gas motion, turbulence levels, and spray-wall interaction. Thus, a reduction in this heat loss through the pistons results in an improvement to the engine's efficiency. It is known that a reduction in the heat transfer through the piston often results in an increase in exhaust temperatures, which can be beneficial for the turbine, after-treatment system and waste heat recovery system. Engines with such features may be characterized as having low heat rejection, which minimizes heat rejection within a specific set of design constraints. With low heat rejection, further efficiencies may be achieved, for example, by reducing cooling system capacity and having a broader fuel tolerance, thus making the engine less vulnerable, lowering specific volume, and lowering weight, all of which increase efficiency of a broader propulsion system.

One approach to reduce heat loss through pistons is through analyzing the shape of components of the piston. Piston bowls are formed as a recess in the crown of a piston and contribute to forming a combustion chamber in a direct injection (e.g., diesel) internal combustion engine. It follows that piston bowl geometry influences thermal efficiency, either due to changes in wall heat loss or to changes in the heat release rate. Piston bowl designs affect the air-to-fuel mixture ratio by influencing the movement of air and fuel during a compression stroke of the internal combustion engine. Effective mixing of air and fuel in the combustion chamber leads to better combustion and, by extension, better engine efficiency, less in-cylinder soot, lower emissions, and lower heat losses.

SUMMARY

The present disclosure generally relates to devices, systems, and methods involving piston bowls for an internal combustion engine. According to embodiments of the present disclosure, a piston may include a skirt, a crown, and a piston bowl. The skirt may have an upper body portion. The crown may be formed at the upper body portion. The piston bowl may be formed at the crown. The piston bowl may include a plurality of combustion surfaces. In examples, the piston bowl includes a first combustion surface and a second combustion surface opposite the first combustion surface. Each of the first combustion surface and the second combustion surface may be formed and positioned to accommodate inflowing injector spray so as to reduce heat transfer caused by impingements made by the inflowing injector spray.

In embodiments, the first combustion surface may include a first combustion surface upper bowl extending radially inward from a periphery of the piston bowl and a first combustion surface lower bowl extending radially inward from the first combustion surface upper bowl. The first combustion surface lower bowl may be further recessed into an upper surface of the piston bowl than the first combustion surface upper bowl. And the second combustion surface may include a second combustion surface upper bowl extending radially inward from the periphery of the piston bowl and a second combustion surface lower bowl extending radially inward from the second combustion surface upper bowl. The second combustion surface lower bowl may be further recessed into an upper surface of the piston bowl than the second combustion surface upper bowl.

In embodiments, the first combustion surface comprises a first peripheral end and the second combustion surface comprises a second peripheral end. The first peripheral end and the second peripheral end may be opposing ends of the piston bowl. A first combustion surface vertical midplane may extend in a direction from the first peripheral end to the second peripheral end. A second combustion surface vertical midplane may extend in the direction from the first peripheral end to the second peripheral end. The first combustion surface vertical midplane may be laterally offset from the second combustion surface vertical midplane.

In embodiments, a first combustion surface sidewall may extend generally radially inward at a first angle relative to the first combustion surface vertical midplane, and a second combustion surface sidewall extend generally radially inward at a second angle relative to the second combustion surface vertical midplane. In embodiments, at least one of the first angle may be generally perpendicular to the first combustion surface vertical midplane and the second angle may be generally perpendicular to the second combustion surface vertical midplane. Iii embodiments, both the first angle may be generally perpendicular to the first combustion surface vertical midplane and the second angle may be generally perpendicular to the second combustion surface vertical midplane.

The present disclosure includes an internal combustion engine may include at least one pair of fuel injectors and at least one piston. The number of pistons may correspond to the number of each pair of fuel injectors in the at least one pair of fuel injectors. The at least one piston may include a skirt having an upper body portion, a crown formed at the upper body portion, and a piston bowl formed in the crown according to embodiments of the present disclosure. In embodiments, the piston bowl may be formed as a recess at an upper surface of the crown. The upper surface may define a horizontal plane extending along the upper surface of the crown may have each of a first peripheral end and a second peripheral end opposite the first peripheral end. A central axis of the crown may extend in plane with the horizontal plane and between the first peripheral end and the second peripheral end. Each fuel injector in the at least one pair of fuel injectors may be configured to spray the inflowing injector spray into the piston bowl at an entry angle of between about 15 degrees and about 25 degrees from the central axis.

The present disclosure may include a method of operating an internal combustion engine. The internal combustion engine may have at least one cylinder and a piston slidably accommodated within the at least one cylinder. The method may include moving the piston toward a top dead center position during a compression stroke. The method may include spraying a fuel stream into an air charge mixture in a volume defined by a piston bowl according to the present disclosure. Spraying the fuel stream into the air charge mixture between a pair of injectors may be in phase or out of phase. In embodiments, spraying the fuel stream into the air charge mixture in the volume defined by the piston bowl may include spraying a first fuel stream into a first air charge mixture in a first volume defined by the first combustion surface and spraying a second fuel stream into a second air charge mixture in a second volume defined by the second combustion surface. In embodiments, there may be a time lag between spraying the first fuel stream and spraying the second fuel stream. In embodiments, spraying the fuel stream into the air charge mixture in the volume defined by the piston bowl comprises simultaneously spraying at least three injector streams into a first volume defined by the first combustion surface and separately spraying at least three injector streams into a second volume defined by the second combustion surface. In embodiments, each of the at least three injector streams comprises six injector streams.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1:
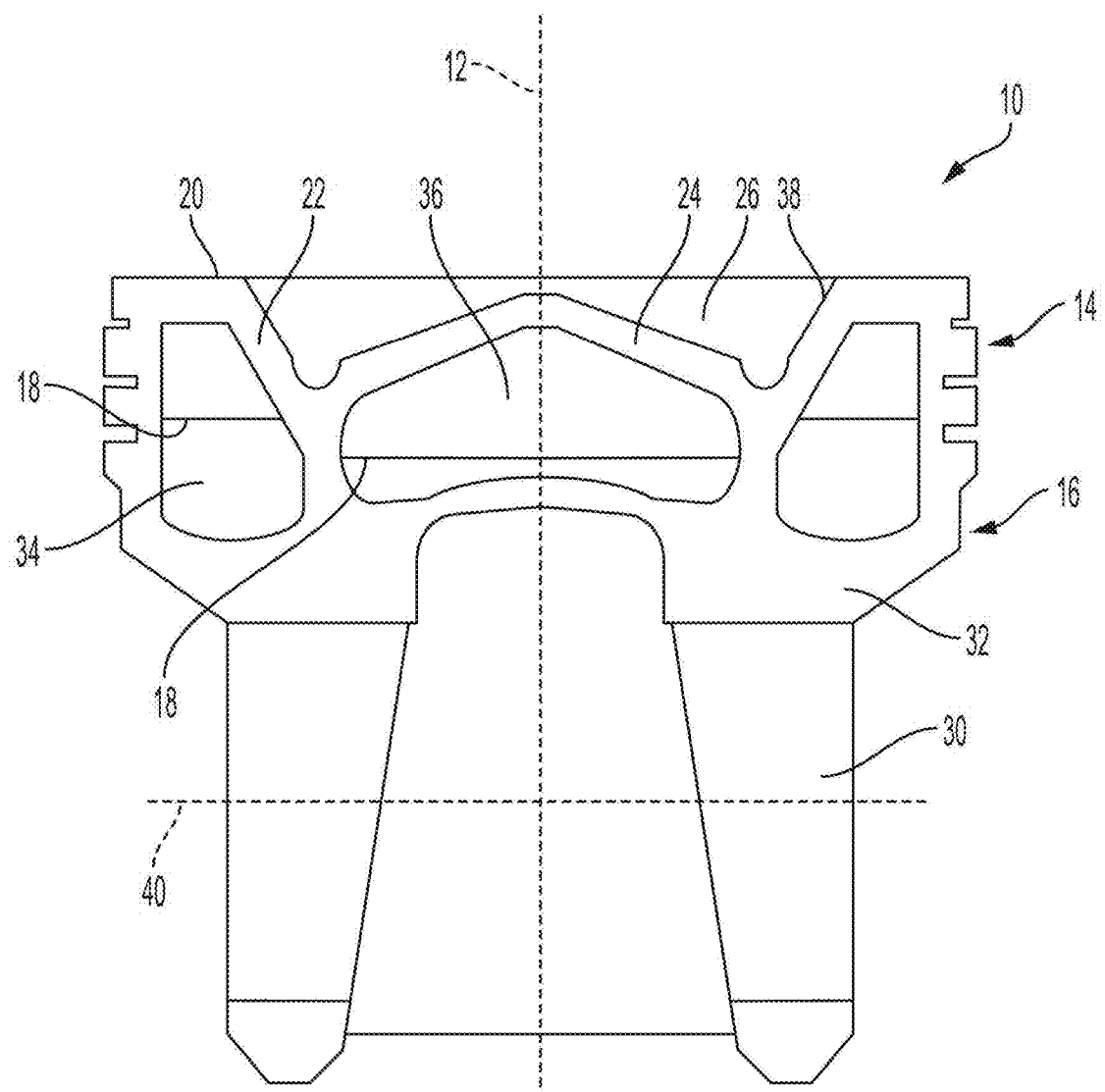
FIG. 1 is a cross-sectional view of a prior art piston.

Although the drawings represent embodiments of the various features and components according to the present disclosure, the drawings are not necessarily to scale and certain features may be exaggerated in order to better illustrate and explain the present disclosure. The exemplification set out herein illustrates embodiments of the disclosure, and such exemplifications are not to be construed as limiting the scope of the disclosure in any manner.

DETAILED DESCRIPTION OF EMBODIMENTS OF THE DISCLOSURE

For the purpose of promoting an understanding of the principles of the disclosure, reference will now be made to the embodiments illustrated in the drawings, which are described below. It will nevertheless be understood that no limitation of the scope of the disclosure is thereby intended. The disclosure includes any alterations and further modifications in the illustrated device and described methods and further applications of the principles of the disclosure, which would normally occur to one skilled in the art to which the disclosure relates. Moreover, the embodiments were selected for description to enable one of ordinary skill in the art to practice the disclosure.

As described below, in various embodiments the present disclosure provides piston features and internal combustion engines and operating techniques based on the piston features and designs. Such piston features and designs may be appropriate for both exhaust pistons and intake pistons. Referring now to FIG. 1, a prior art piston is shown. The piston 10 is a generally cylindrical structure having a longitudinal axis 12. In general, the piston 10 includes a crown 14 and a skirt 16. In this example, the crown 14 is welded such as by friction welding at weld lines 18 to the skirt 16. The crown 14 includes an upper surface 20, an outer wall 22 and a central wall 24. The outer wall 22 and the central wall 24 together form a piston bowl 26. A fuel injector (not shown) provides controlled injections of fuel into the piston bowl 26 during engine operation which, in a compression-ignition engine, results in combustion when the piston 10 is near the top-dead-center ("TDC") position.

The skirt 16 includes a central opening 30 configured to receive a wrist pin (not shown) for connecting the piston 10 to a connecting rod (not shown). The skirt 16 also includes an upper body portion 32, which is welded to the crown 14 at weld lines 18. As shown, the crown 14 and the upper body portion 32 of the skirt 16 are formed such that when connected together at weld lines 18, an outer peripheral air gap 34 and a central air gap 36 are formed. In a typical manufacturing process, the crown 14 and the skirt 16 are forged, then joined by friction welding.

Figure 2:
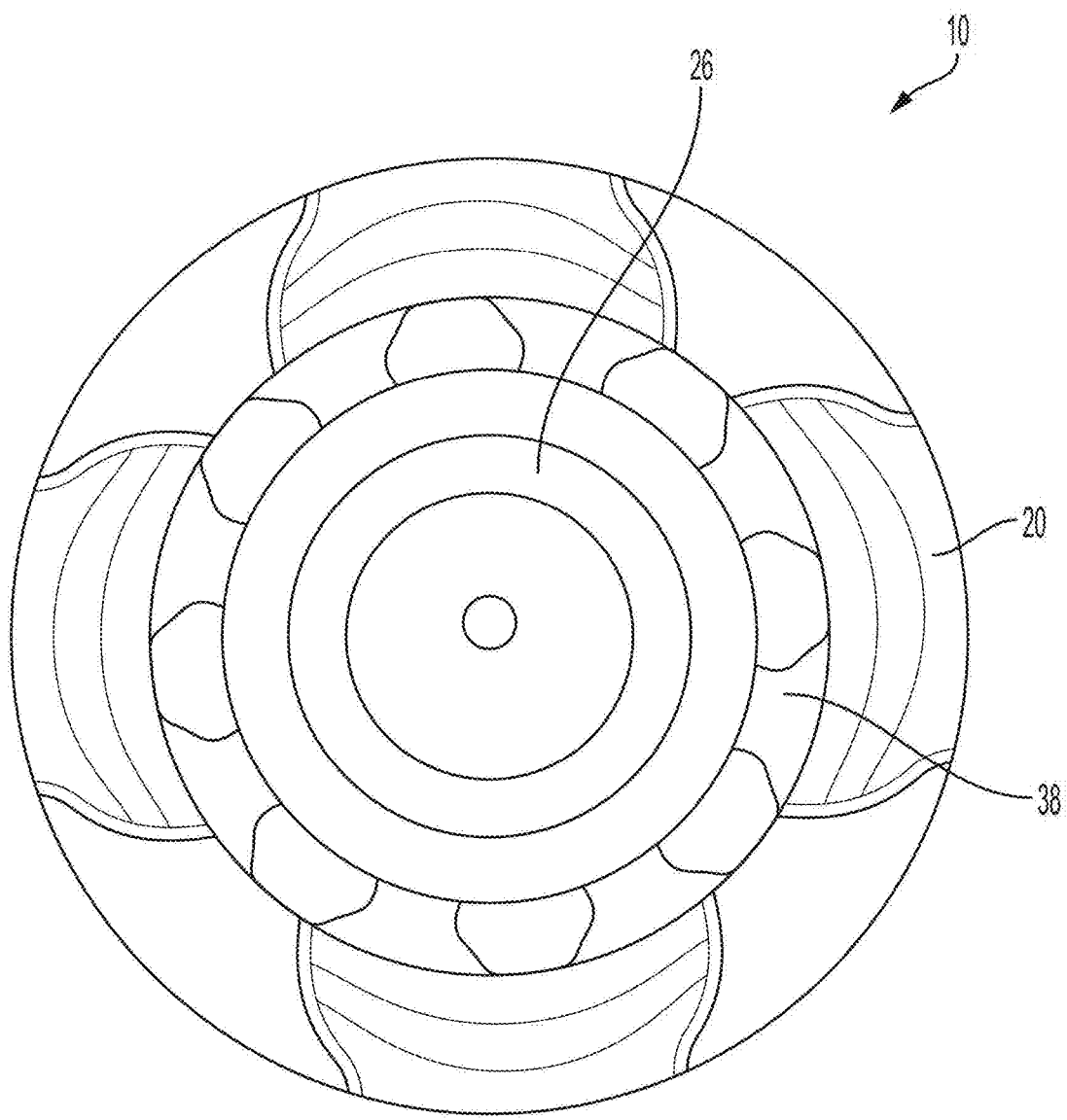
FIG. 2 is a top view of a prior art piston showing oxidation.

The piston 10 provides reduced heat transfer through the piston 10, but as shown, the piston bowl 26 does not include features of the present disclosure. For example, the design of the piston bowl 26 illustrated here may lead to hot spray impingements on walls of the piston bowl 26 thereby generating heat flux in the piston 10 and local piston oxidation. Moreover, these impingements may cause very high temperatures in the piston bowl 26. As shown in FIG. 2, this high temperature may result in oxidation in the piston bowl 26, in particular in the bowl rim 38.

Figure 3:
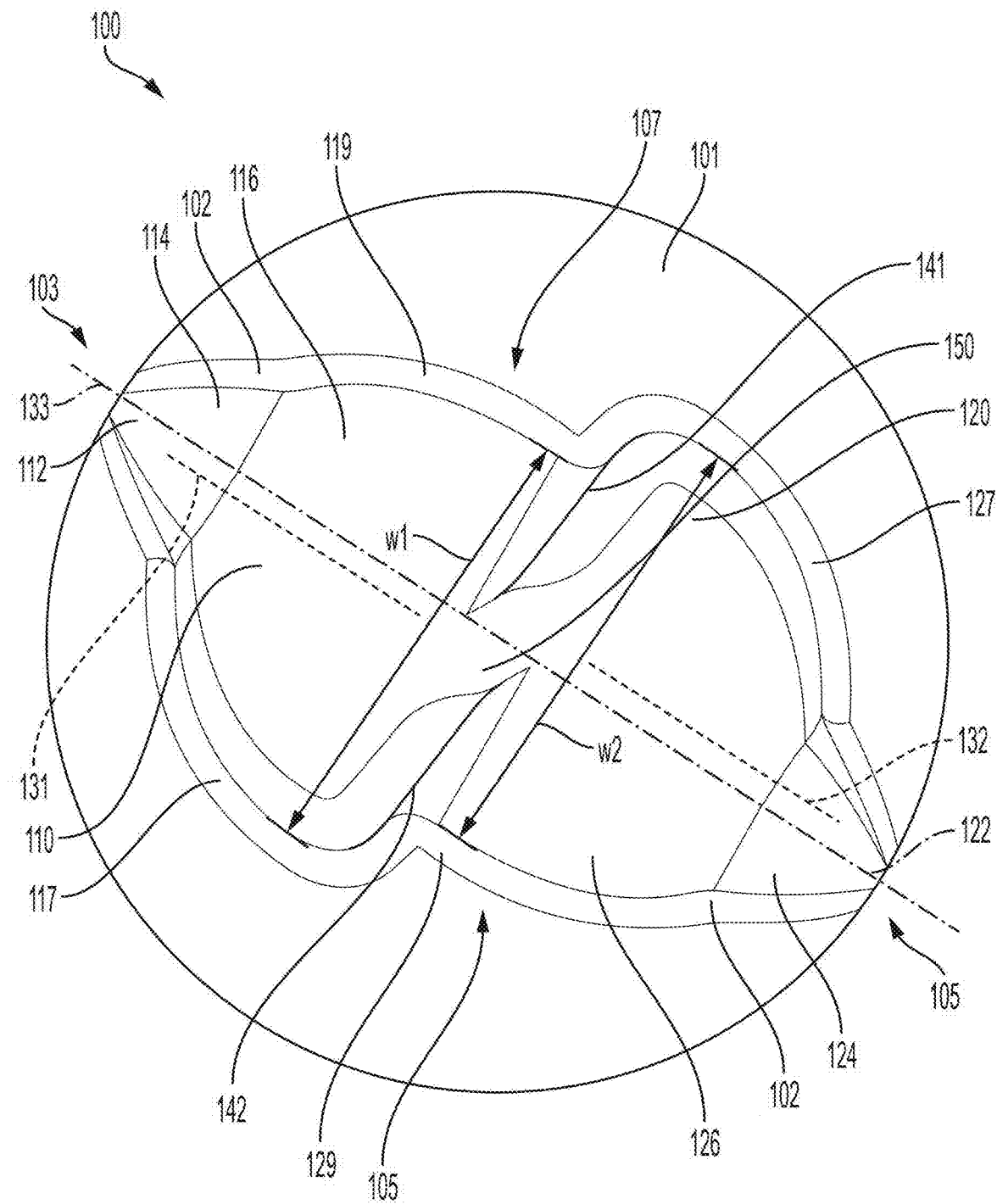
FIG. 3 is perspective view of a piston bowl according to the present disclosure.

Referring now to FIG. 3, a piston bowl for a piston made according to the principles of the present disclosure is shown. Like piston 10, a piston employing the piston bowl 100 as shown is a generally cylindrical structure having a longitudinal axis. In general, the piston includes a crown and a skirt. The crown includes an upper surface 101 and a bowl rim 102. The skirt includes a central opening configured to receive a wrist pin for connecting the piston to a connecting rod. The skirt also includes an upper body portion on which crown is formed. Like piston bowl 26, a piston bowl 100 may be formed in the crown of the piston (e.g., by the outer wall 22 and the central wall 24 together). A fuel injector (not shown) provides controlled injections of fuel into the piston bowl 100 during engine operation which, in a compression-ignition engine, results in combustion in a combustion chamber when the piston is near the top-dead-center ("TDC") position. By modifying contours and surfaces in the piston bowl 100, for example, by optimizing the shape of the piston bowl 100 around the fuel injector spray considering the swirling effects on the fuel injector spray trajectory, efficiency of the engine may be increased.

Piston bowls 100 according principles of the present disclosure may include a plurality of combustion surfaces. In examples, the piston bowl includes a first combustion surface 110 and a second combustion surface 120. The second combustion surface 120 may be opposite the first combustion surface 110. Each of the first combustion surface 110 and the second combustion surface 120 may be formed and positioned to accommodate inflowing injector spray so as to reduce heat transfer caused by impingements made by the inflowing injector spray. As described further hereinafter, the first combustion surface 110 and the second combustion surface 120 may be united in form, but their design may allow them to act as two functionally separated combustion chambers 105 and 107 during operation. In this way, the piston bowl 100 may minimize brake specific heat rejection at high engine horsepower (e.g., 1000 HP), minimize in-cylinder heat losses due to minimum piston walls temperatures thereby increasing durability, and minimize strong-heat-flux footprints (e.g., hot spots) on the piston surface thereby reducing dangerous metal oxidation.

As shown in FIG. 3, the piston bowl 100 may be formed as a recess at an upper surface 101 of the crown. The upper surface 101 may define a horizontal plane extending along the upper surface 101 of the crown and may have each of a first peripheral end 103 and a second peripheral end 105 opposite the first peripheral end 103. In embodiments, the first combustion surface 110 comprises a first peripheral inlet port 112 at the first peripheral end 103, and the second combustion surface 120 comprises a second peripheral inlet port 122 at the second peripheral end 105. A depth (e.g., of recession) of the first combustion surface 110 may generally increase in a direction generally extending radially inward from the first peripheral inlet port 112, and a depth (e.g., of recession) of the second combustion surface 120 may generally increase in a direction generally extending radially inward from the second peripheral inlet port 122. In embodiments, a width of the first combustion surface 110 may generally increase in the direction extending radially inward from the first peripheral inlet port 112, and a width of the second combustion surface 120 may generally increase in a direction extending radially inward from the second peripheral inlet port 122.

Each of the first combustion surface 110 and the second combustion surface 120 may comprise one or more bowls. For example, at least a majority of either or both of the first combustion surface 110 and the second combustion surface 120 may be one continuous surface. On the other hand, in embodiments, the first combustion surface 110 may include a first combustion surface upper bowl 114 extending radially inward from a periphery of the piston bowl 100 and a first combustion surface lower bowl 116 extending radially inward from the first, combustion surface upper bowl 114. The second combustion surface 120 may include a second combustion surface upper bowl 124 extending radially inward from the periphery of the piston bowl 100 and a second combustion surface lower bowl 126 extending radially inward from the second combustion surface upper bowl 124. In any of these multiple-bowl cases, the first combustion surface lower bowl 116 may be further recessed than the first combustion surface upper bowl 114. In addition, or in alternative, the second combustion surface lower bowl 126 may be further recessed than the second combustion surface upper bowl 124.

Profiles of each of the first combustion surface 110 and the second combustion surface 120 may be asymmetrical. In embodiments, the first combustion surface lower bowl 116 may include a first combustion surface first rim 117 and a first combustion surface second rim 119 opposite the first combustion surface first rim 117. The first combustion surface first rim 117 and the first combustion surface second rim 119 may define a width, "W1" of the first combustion surface 110 at the upper surface 101 of the piston bowl 100 such that the first combustion surface lower bowl 116 transitions to the upper surface 101 at the first combustion surface first rim 117 and the first combustion surface second rim 119. The first combustion surface first rim 117 may have an arc length greater in magnitude than that of the first combustion surface second rim 119. The second combustion surface lower bowl 126 may include a second combustion surface first rim 127 and a second combustion surface second rim 129 opposite the second combustion surface first rim 127. The second combustion surface first rim 127 and the second combustion surface second rim 129 may define a width, W2 of the second combustion surface 120 at the upper surface 101 of the piston bowl 100 such that the second combustion surface lower bowl 126 transitions to the upper surface 101 at the second combustion surface first rim 127 and the second combustion surface second rim 129. The second combustion surface first rim 127 may have an arc length greater in magnitude than that of the second combustion surface second rim 129. Each of the first combustion surface first and second rims 117, 119 and the second combustion surface first and second rims 127, 129 may be portions of the bowl rim 102. As discussed further hereinafter, each of the first combustion surface 110 and the second combustion surface 120 (e.g., the first combustion surface first and second rims 117, 119 and the second combustion surface first and second rims 127, 129) may function to form at, least a portion of the outer boundary of a combustion chamber 105 or 107, respectively.

Still referencing FIG. 3, the first combustion surface 110 and the second combustion surface 120 may be offset from each other. In embodiments the first combustion surface 110 includes a first peripheral end 103 of the piston bowl 100, and the second combustion surface 120 includes a second peripheral end 105 of the piston bowl 100. The first peripheral end 103 and the second peripheral end 105 may be opposing ends of the piston bowl 100. For example, as discussed above, a first peripheral inlet port 112 may be positioned at the first peripheral end 103, opening into a remainder of the first combustion surface 110 as it extends radially inward from the first peripheral inlet port 112. As well, a second peripheral inlet port 122 may be positioned at the second peripheral end 105, opening into a remainder of the second combustion surface 120 as it extends radially inward from the second peripheral inlet port 122. A first combustion surface vertical midplane 131 may extend in a direction from the first peripheral end 103 to the second peripheral end 105. A second combustion surface vertical midplane 132 may extend in the direction from the first peripheral end 103 to the second peripheral end 105. The first combustion surface vertical midplane 131 may be laterally offset from the second combustion surface vertical midplane 132. While the remainders of the first combustion surface 110 and the second combustion surface 120 may be offset from each other, each of the first inlet port and the second inlet port may be coaxially aligned about a central axis 133 extending from the first peripheral end 103 to the second peripheral end 105. In this way the first peripheral inlet port 112 and the second peripheral inlet port 122 may receive inflowing injector spray in a similar manner.

Each of the first combustion surface 110 and the second combustion surface 120 may include a sidewall extending in a transverse direction relative to the central axis 133 at their innermost portions. Under these circumstances, at least a portion of the sidewalls may oppose their respective inlet port such that inflowing injector spray enters the inlet port and flows toward the respective sidewall. In embodiments, a first combustion surface sidewall 141 may extend generally radially inward at a first angle relative to the first combustion surface vertical midplane 131, and a second combustion surface sidewall 142 extend generally radially inward at a second angle relative to the second combustion surface vertical midplane 132. In embodiments, at least one of the first angle may be generally perpendicular to the first combustion surface vertical midplane 131 and the second angle may be generally perpendicular to the second combustion surface vertical midplane 132. In embodiments, both the first angle may be generally perpendicular to the first combustion surface vertical midplane 131 and the second angle may be generally perpendicular to the second combustion surface vertical midplane 132. In embodiments, both the first angle and the second angle may have equal magnitudes.

Portions of each of the first combustion surface 110 and the second combustion surface 120 may overlap to form certain features of the piston bowl 100 to improve mixing for combustion events. In embodiments, an innermost portion of the first combustion surface 110 is positioned closer to the second peripheral end 105 than the first peripheral end 103, and an innermost portion of the second combustion surface 120 is positioned closer to the first peripheral end 103 than the second peripheral end 105. For example, as shown, the first combustion surface sidewall 141 may extend into the second combustion surface lower bowl 126, and the second combustion surface sidewall 142 may extend into the first combustion surface lower bowl 116. In embodiments, an intersection of the first combustion surface 110 and the second combustion surface 120 forms a shared passageway 150 extending between the first combustion surface sidewall 141 and the second combustion surface sidewall 142. As shown, both the first combustion surface sidewall 141 and the second combustion surface sidewall 142 may transition into the shared passageway 150. This way, a flow field of the piston bowl 100 may be improved, thereby improving mixing in the center of the piston bowl 100.

Inflowing injector flow for combustion events may have a prescribed inclusion angle of entry into the piston bowl 100 for multiple injector streams. As alluded to prior, a central axis 133 of the piston bowl 100 may extend in plane with the horizontal plane and between the first peripheral end 103 and the second peripheral end 105. In embodiments, each of the first combustion surface 110 and the second combustion surface 120 are configured to receive inflowing injector spray that is at an entry angle of between about 15 degrees and about 25 degrees from a central axis 133 extending in plane with an upper surface 101 of the piston bowl 100 and between the first peripheral end 103 and the second peripheral end 105. For example, inflowing injector spray may have an entry angle of between about 17 degrees and about 19 degrees. In embodiments, inflowing injector spray may have an entry angle of at least about 19 degrees from the central axis 133. And the inflowing injector spray may comprise multiple injector streams, each of which forms an entry angle equal in magnitude (albeit in different orientations) with the central axis 133. In embodiments, the inflowing injector spray may include at least three injector streams. In embodiments, the inflowing injector spray may include six injector streams, which may require shorter sprays penetrations and thinner streams over having less than six injector streams. Such injector streams may correspond to fluid injectors using 6-hole nozzles for an internal combustion engine.

Figure 4:
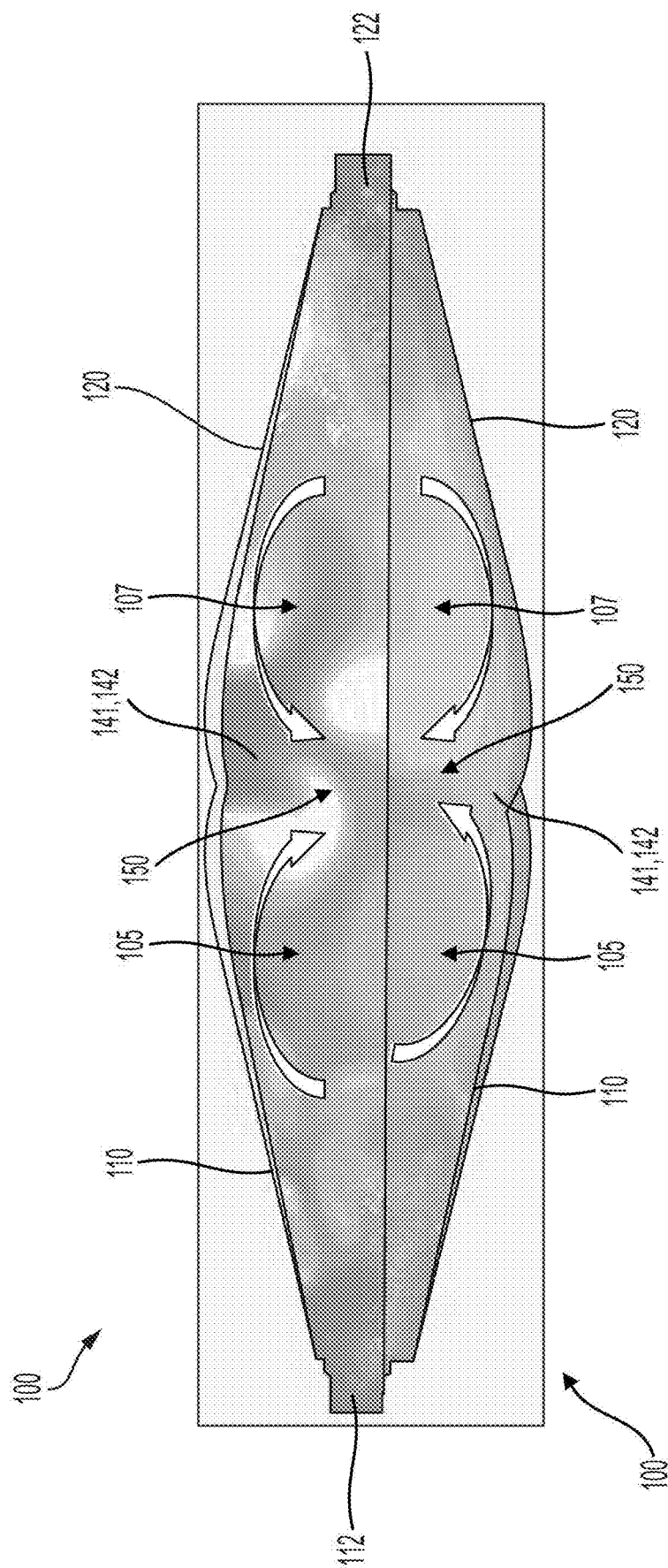
FIG. 4 is a equivalence ratio plot of a combustion chamber including a piston bowl according to the present disclosure.

An internal combustion engine (not shown) according to embodiments of the present disclosure may include at least one pair of fuel injectors and at least one piston. The number of pistons may correspond to the number of pairs of fuel injectors in the at least one pair of fuel injectors. Such fuel injectors may be high cup flow injectors (e.g., about 400 pph). As alluded to prior, each fuel injector may be symmetrically positioned relative to the piston bowl 100, for example, such that a first injector sprays injector streams into the first peripheral inlet port 112 and a second injector sprays injector streams into the second peripheral inlet port 122. Each fuel injector in the at least one pair of fuel injectors may be configured to spray the inflowing injector spray into the piston bowl 100 at an entry angles as discussed above. For example, such entry angles may be between about 15 degrees and about 25 degrees from the central axis 133, between about 17 degrees and 19 degrees from the central axis 133, or at least 19 degrees from the central axis 133. In embodiments, the internal combustion engine is an opposed piston engine, such as a two-stroke opposed piston engine. Under these circumstances, the first combustion surface 110 and the second combustion surface 120 may form the combustion chambers 105, 107, for example, when each of the opposed pistons is at TDC, as shown in FIG. 4. As shown, the combustion chambers 105, 107 are defined by two piston bowls 100 mirrored about the horizontal plane. Because the piston bowls 100 are optimized around the fuel injectors and their respective streams, volumes for combustion defined by two chambers 105, 107 formed by the first combustion surface 110 and the second combustion surface 120 do not include unnecessary, unused portions of the piston bowls 100. In this way, mixing at the centers of the piston bowls 100, as indicated by the curling arrows, may be improved and hot spots formed at the piston bowls 100 may be limited.

Piston bowls according to principles of the present disclosure allow for improved mixing and better combustion, both of which reduces heat transfer to the pistons. The piston bowl shape shown here (and discussed elsewhere herein) increases thermal efficiency while reducing heat losses. Such piston bowls may be characterized as having an optimized brake specific heat rejection, having low net in-cylinder reduction in heat losses, due to their balance between indicated thermal efficiencies (in kW) and heat loss per power. Thus, while valuing relatively high values of indicated thermal efficiencies, principles of brake specific heat rejection optimization also include limiting excessively high values of thermal efficiency, which may lead to excessively hot combustion resulting in high in-cylinder heat losses that will negate other heat loss gains achieved elsewhere in the system.

Figure 5A:
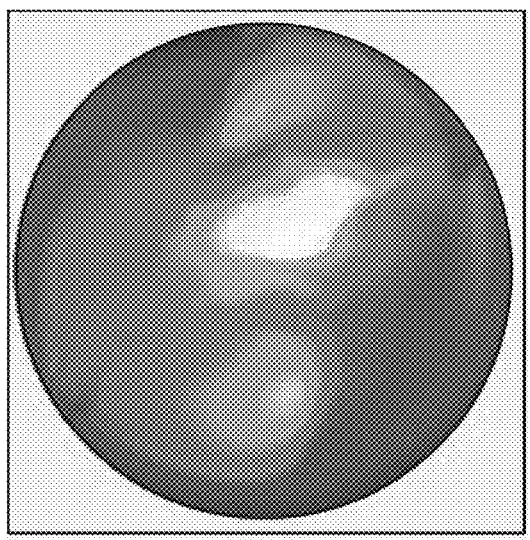
FIG. 5A is a heat flux contour plot for a prior art piston bowl in an exhaust piston.
Figure 5B:
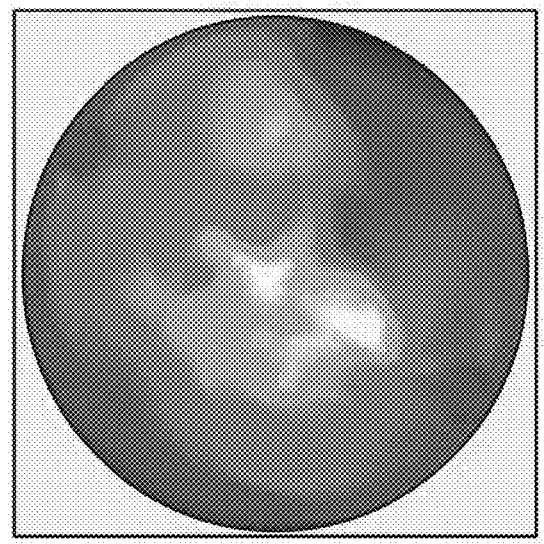
FIG. 5B is a heat flux contour plot for a prior art piston bowl in an intake piston.
Figure 5C:
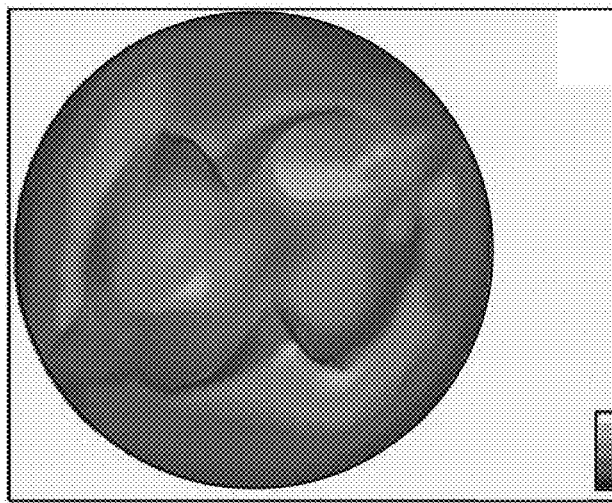
FIG. 5C is a heat flux contour plot for a piston bowl in an exhaust piston according to the present disclosure.
Figure 5D:
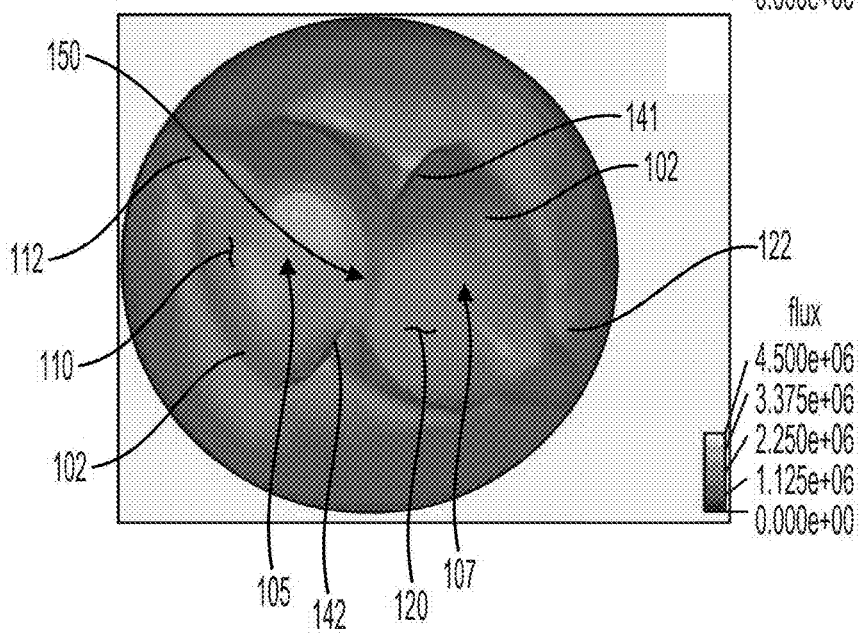
FIG. 5D is a heat flux contour plot for a piston bowl in an intake piston according to the present disclosure.

FIGS. 5A-5D show contour plots of heat flux for various piston bowls during injector spray events. FIGS. 5A and 5B show heat flux contour plots for prior art piston bowls for exhaust and intake pistons respectively. FIGS. 5C and 5D show heat flux contour plots for pistons bowls similar to those discussed herein, including the piston bowl 100, for exhaust and intake pistons respectively. As can be seen in the contour plot as shown across these figures, the surface features of the piston bowls 100 according to principles of the present disclosure shown in FIGS. 5C and 5D, including the first combustion surface 110 and the second combustion surface 120 defining the combustion chambers 105, 107, accommodate (and are thus optimized for accommodating) injector spray with reduced heat flux and minimal local hot spots as compared to those of FIGS. 5A and 5B.

Figure 6:
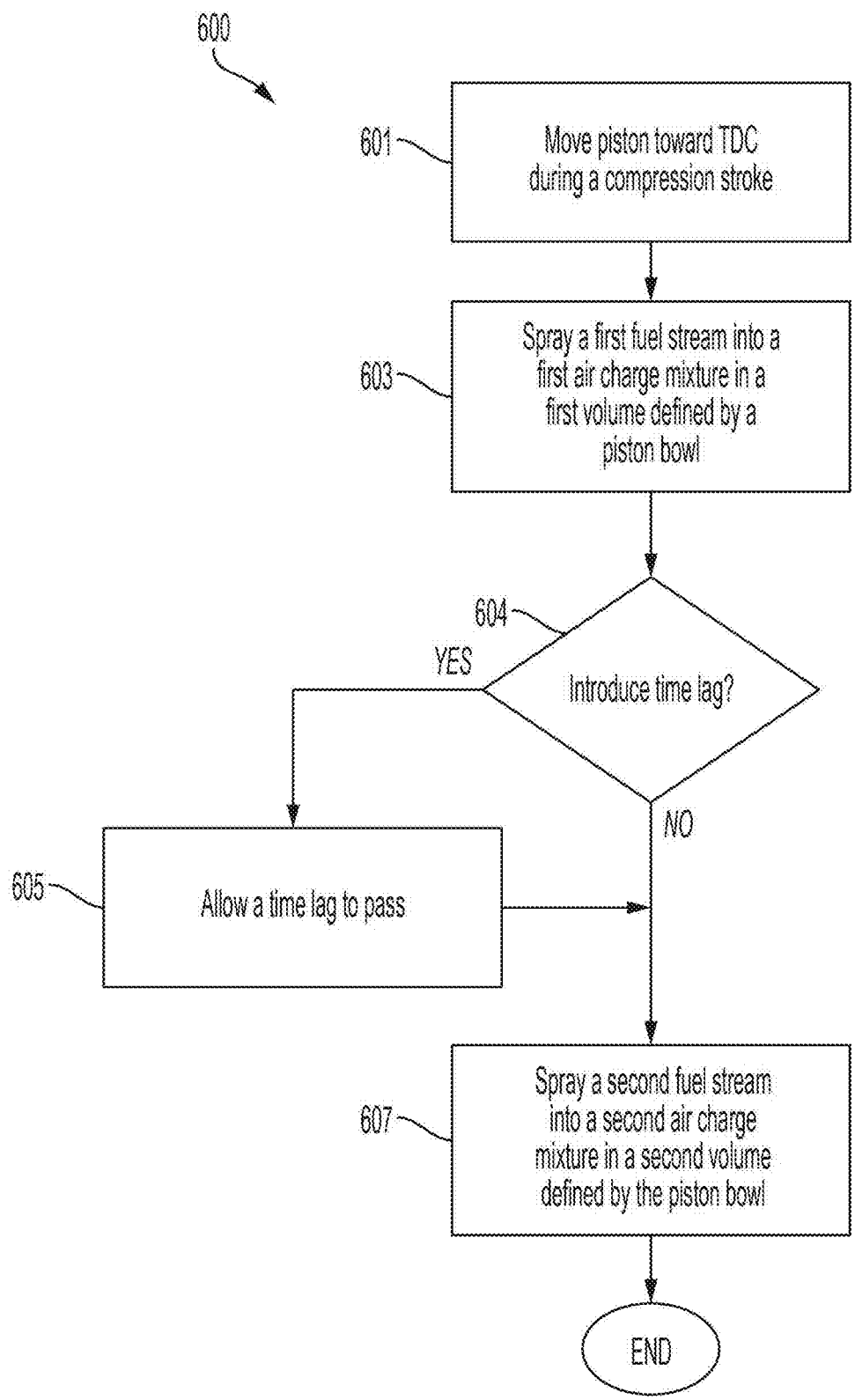
FIG. 6 is a flowchart of a method of operating an internal combustion engine having a piston bowl in an intake piston according to the present disclosure.

The present disclosure includes a method 600 of operating an internal combustion engine as shown in the flowchart of FIG. 6. The internal combustion engine may have at least one cylinder and a piston slidably accommodated within the at least one cylinder. The piston may include a piston bowl, which may be similar to those piston bowls described elsewhere herein, including the piston bowl 100. At step 601, the method may include moving the piston toward a top dead center position during a compression stroke. An air charge mixture (e.g., a gas charge or, simply, a charge) may be a mixture of incoming fresh air and residual (e.g., remaining) exhaust gases inside a cylinder from a previous combustion cycle (e.g., because, cycle to cycle, there is no perfect, complete gas replacement). At step 603, the method may include spraying a first fuel stream into an air charge mixture in a volume defined by the piston bowl 100, such as into the combustion chambers 105, 107. As described further hereinafter, in embodiments, the method may include allowing a time lag to pass at step 605 and spraying a second fuel stream into the air charge mixture in the volume defined by the piston bowl 100, such as into the combustion chambers 105, 107, at step 607.

Spraying the fuel stream into the air charge mixture between a pair of injectors may be in phase or out of phase. In embodiments, at step 603, spraying the fuel stream into the air charge mixture in the volume or chambers 105, 107 defined by the piston bowl 100 may include spraying a first fuel stream into a first air charge mixture in a first volume, such as the first combustion chamber 105, defined by the first combustion surface 110 and spraying a second fuel stream into a second air charge mixture in a second volume, such as the second combustion chamber 107, defined by the second combustion surface 120. At step 604, it may be determined whether a time lag should be introduced. If a time lag is to be introduced, the method may continue to step 605, but if a time lag is not to be introduced, the method may continue to step 607. In embodiments, at step 605, there is a time lag between spraying the first fuel stream and spraying the second fuel stream. For example, the time lag may be between about 6 degrees and about 10 degrees. As a further example, the time lag may be about 8 degrees. In embodiments, at step 607, spraying the fuel stream into the air charge mixture in the volume, such as the chambers 105, 107, defined by the piston bowl 100 comprises simultaneously spraying at least three injector streams into a first air charge mixture in a first volume, such as the first combustion chamber 105, defined by the first combustion surface 110 and separately spraying at least three injector streams into a second air charge mixture in a second volume, such as the second combustion chamber 107, defined by the second combustion surface 120. In embodiments, each of the at least three injector streams comprises six injector streams.

The connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present, in an embodiment, C alone may be present in an embodiment, or that any combination of the elements A, B or C may be present in a single embodiment; for example, A and B, A and C. B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element, is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus While the embodiments have been described as having exemplary designs, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

We claim:

1. A piston comprising:
a skirt having an upper body portion:
a crown formed at the upper body portion; and a piston bowl formed at the crown, the piston bowl including a plurality of combustion surfaces defining two functionally separated, opposing combustion chambers formed and positioned to accommodate inflowing injector spray so as to reduce heat, transfer caused by impingements made by the inflowing injector spray.

2. The piston of claim 1, wherein the plurality of combustion surfaces comprises first and second combustion surfaces; wherein the first combustion surface includes a first peripheral end of the piston bowl and the second combustion surface includes a second peripheral end of the piston bowl, the first peripheral end and the second peripheral end being opposing ends of the piston bowl; and wherein a first combustion surface vertical midplane extending in a direction from the first peripheral end to the second peripheral end is laterally offset from a second combustion surface vertical midplane extending in the direction from the first peripheral end to the second peripheral end.

3. The piston of claim 1, wherein the plurality of combustion surfaces comprises first and second combustion surfaces, and wherein a first combustion surface sidewall generally extends radially inward at a first angle relative to a first combustion surface vertical midplane, and a second combustion surface sidewall generally extends radially inward at a second angle relative to a second combustion surface vertical midplane.

4. The piston of claim 3, wherein at least one of the first angle is generally perpendicular to the first combustion surface vertical midplane and the second angle is generally perpendicular to the second combustion surface vertical midplane.

5. The piston of claim 4, wherein both the first angle is generally perpendicular to the first combustion surface vertical midplane and the second angle is generally perpendicular to the second combustion surface vertical midplane.

6. The piston of claim 1, wherein the plurality of combustion surfaces comprises first and second combustion surfaces, and wherein each of the first combustion surface and the second combustion surface are configured to receive the inflowing injector spray that is at an entry angle of between about 15 degrees and about 25 degrees from a central axis extending in plane with an upper surface of the piston bowl and along a central midplane between a first combustion surface vertical midplane and a second combustion surface vertical midplane.

7. The piston of claim 1, wherein the plurality of combustion surfaces comprises first and second combustion surfaces; and wherein the first combustion surface comprises a first peripheral inlet port at a first peripheral end of the piston bowl and the second combustion surface comprises a second peripheral inlet port at a second peripheral end of the piston bowl, the first peripheral end being opposite the second peripheral end, and wherein a depth of the first combustion surface generally increases in a direction extending radially inward from the first peripheral inlet port, and a depth of the second combustion surface generally increases in a direction extending radially inward from the second peripheral inlet port.

8. The piston of claim 7, wherein a width of the first combustion surface generally increases in a direction extending radially inward from the first peripheral inlet port, and a width of the second combustion surface generally increases in a direction extending radially inward from the second peripheral inlet port.

9. The piston of claim 7, wherein an innermost portion of the first combustion surface is positioned closer to the second peripheral end than the first peripheral end and an innermost portion of the second combustion surface is positioned closer the first peripheral end than the second peripheral end.

10. The piston of claim 1, wherein an intersection of each combustion surface in the plurality of combustion surfaces forms a shared passageway extending between a first combustion surface sidewall and a second combustion surface sidewall.

11. The piston of claim 2, wherein the first combustion surface includes a first combustion surface upper bowl extending radially inward from a periphery of the piston bowl and a first combustion surface lower bowl extending radially inward from the first combustion surface upper bowl, the first combustion surface lower bowl being further recessed into an upper surface of the piston, bowl than the first combustion surface upper bowl, and the second combustion surface includes a second combustion surface upper bowl extending radially inward from the periphery of the piston bowl and a second combustion surface lower bowl extending radially inward from the second combustion surface upper bowl, the second combustion surface lower bowl being farther recessed into the upper surface of the piston bowl than the second combustion surface upper bowl.

12. The piston of claim 11, wherein the first combustion surface lower bowl includes a first combustion surface first rim and a first combustion surface second rim opposite the first combustion surface first rim, the first combustion surface first rim having an arc length greater in magnitude than that of the first combustion surface second rim, and wherein the second combustion surface lower bowl includes a second combustion surface first rim and a second combustion surface second rim opposite the second combustion surface first rim, the second combustion surface first rim having an arc length greater in magnitude than that of the second combustion surface second rim.

13. An internal combustion engine comprising:
at least one pair of fuel injectors; and
at least one piston for each pair of fuel injectors in the at least one pair of fuel injectors, the at least one piston including:
a skirt having an upper body portion;
a crown formed at the upper body portion; and
a piston bowl formed at the crown, the piston bowl including a first combustion surface and a second combustion surface opposite the first combustion surfaces the first combustion surface and the second combustion surface defining two functionally separated combustion chambers being formed and positioned to accommodate inflowing injector spray so as to reduce heat transfer caused by impingements made by the inflowing injector spray.

14. The internal combustion engine of claim 13, wherein the piston bowl is formed as a recess at an upper surface of the crown, the upper surface defining a horizontal plane extending along the upper surface of the crown and having each of a first peripheral end and a second peripheral end opposite the first peripheral end, wherein a central axis of the piston bowl extends in plane with the horizontal plane and between the first peripheral end and the second peripheral end, and wherein each of the fuel injectors in the at least one pair of fuel injectors is configured to spray the mowing injector spray into the piston bowl at an entry angle of between about 15 degrees and about 25 degrees from the central axis.

15. The internal combustion engine of claim 13, wherein the inflowing injector spray comprises at least three injector streams.

16. The internal combustion engine of claim 13, the Mowing injector spray comprises six injector streams.

17. A method of operating an internal combustion engine having at least one cylinder and a piston slidably accommodated within the at least one cylinder, the method comprising:
moving the piston toward a top dead center position during a compression stroke; and
spraying a fuel stream into an air charge mixture in a volume defined by a piston bowl, the piston bowl including a first combustion surface and a second combustion surface opposite the first combustion surface, the first combustion surface and the second combustion surface defining two functionally separated combustion chambers being formed and positioned to accommodate inflowing injector spray so as to reduce heat transfer caused by impingements made by the inflowing injector spray.

18. The method of claim 17, wherein the two functionally separated combustion chambers includes a first combustion chamber defined by the first combustion surface and a second combustion chamber defined by the second combustion surface, and wherein spraying the fuel stream into the air charge mixture in the volume defined by the piston bowl comprises spraying a first fuel stream into a first air charge mixture in the first combustion chamber and spraying a second Mel stream into a second air charge mixture in the second combustion chamber, and wherein there is a time lag between spraying the first fuel stream and spraying the second fuel stream.

19. The method of claim 17, wherein the two functionally separated combustion chambers includes a first combustion chamber defined by the first combustion surface and a second combustion chamber defined by the second combustion surface, and wherein spraying fuel stream, into the air charge mixture in the volume defined by the piston bowl comprises simultaneously spraying at least three injector streams into a first air charge mixture in first combustion chamber and separately spraying at least three injector streams into a second air charge mixture in the second combustion-chamber.

20. The method of claim 17, wherein spraying the fuel stream comprises spraying the fuel stream into upper bowls and lower bowls of the first combustion surface and the second combustion surface at an entry angle of between about 15 degrees and about 25 degrees.

* * * * *